United States Patent

Miyazaki

[15] 3,645,285
[45] Feb. 29, 1972

[54] FLUID PRESSURE GOVERNOR VALVE

[72] Inventor: Toshio Miyazaki, Yokohama, Japan

[73] Assignee: Nissan Motor Company, Limited, Yokohama, Japan

[22] Filed: June 11, 1970

[21] Appl. No.: 45,390

[30] Foreign Application Priority Data

June 26, 1969 Japan..................................44/50146
June 26, 1969 Japan..................................44/50147

[52] U.S. Cl..............................................137/54, 137/56
[51] Int. Cl................................................G05d 13/38
[58] Field of Search...............................137/54, 56

[56] References Cited

UNITED STATES PATENTS 2,693,810   11/1954   McFarland..........................137/54 X
3,302,659   2/1967   Platz....................................137/54
3,420,251   1/1969   Forster et al.......................137/54

Primary Examiner—Robert G. Nilson
Attorney—McCarthy, Depaoli & O'Brien

[57] ABSTRACT

A fluid pressure governor valve assembly which essentially comprises a unitary governor body and a primary and secondary spring-loaded valve elements slidable received in the governor body, wherein a pressure delivered from a fluid pressure source is regulated by the primary and secondary valve elements which are arranged to move within the body toward and away from a shaft supporting the body under the combined effort of control fluid pressure, the action of the spring and the centrifugal force acting thereon.

3 Claims, 7 Drawing Figures

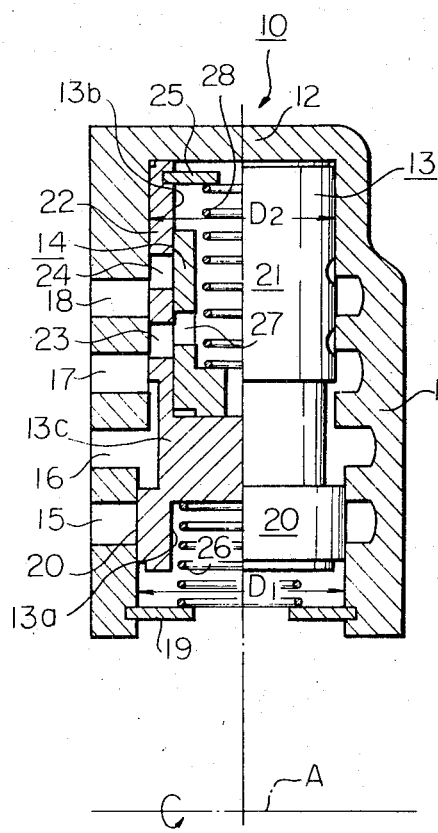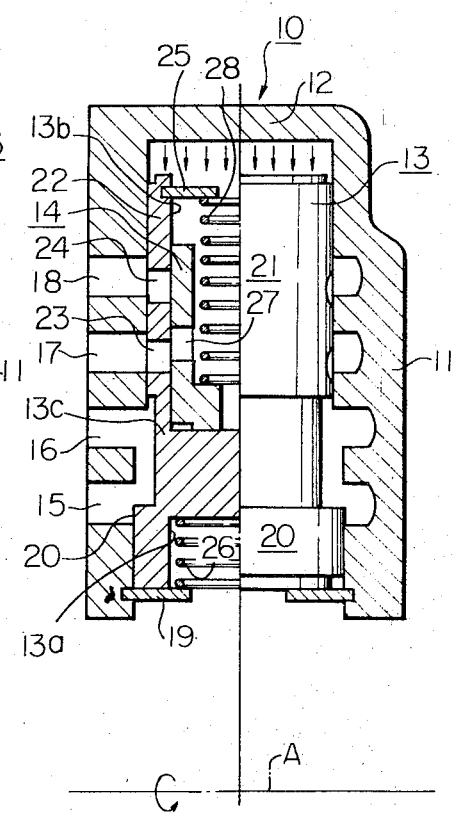

Fig. 4
Fig. 5
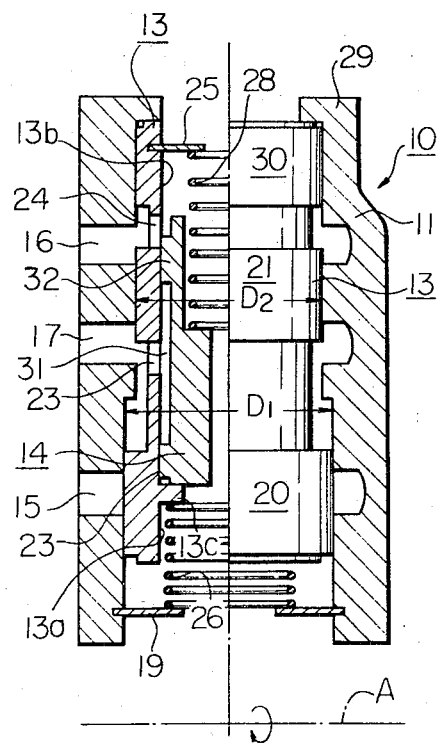
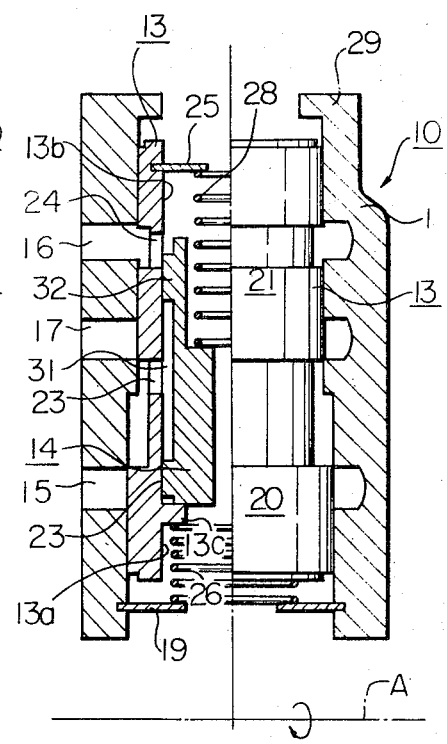

FLUID PRESSURE GOVERNOR VALVE

This invention relates generally to a power transmission of a motor vehicle, and more particularly to a fluid pressure governor valve assembly suitable for use in an automatic control system of the power transmission.

In order to produce the so-called "governor pressure" for an automatic control system of a power transmission of a motor vehicle, it is a conventional practice to provide a compound governor valve assembly having two governor valve members disposed in separate valve chambers.

An object of the invention is to provide an improved fluid pressure governor valve assembly of the type described, which assembly is built completely in a single governor body or valve chamber.

Another object of the invention is to provide a fluid pressure governor valve assembly which is simple in construction, easy and economical to manufacture, and capable of providing governor pressure characteristics which are comparable with those conventional achieved by the use of compound governor assemblies.

According to the present invention, there is provided a fluid pressure governor valve assembly comprising a hollow cylindrical housing having a greater diameter portion and a smaller diameter portion and formed in the sidewall thereof with at least a regulating pressure supply port, a governor pressure output port and an exhaust port, a primary valve element slidably received in the housing and having in its peripheral wall at least an opening and a pair of spaced lands adapted for regulating fluid communication between the ports of the housing, one of the lands being greater in diameter than the other, a secondary valve element slidably received in the primary valve element, a snapring securely anchored in the inner end portion of the housing for restricting inward sliding movement of the primary valve element, means provided at the outer end of the housing for restricting outward movement of the primary valve element, a second snapring securely anchored in the outer end portion of the primary valve element for restricting outward sliding movement of the secondary valve element, a first spring member acting on the primary valve element and seated on the first snapring, a second spring member acting on said secondary valve element and seated on the second snapring. The fluid communication between the ports of the housing is regulated to produce modulated governor pressure at the output port by the primary and secondary valve elements moving under the influence of the control pressure, centrifugal force action thereon and action of the first and second spring members.

In the drawings:

FIG. 1 to 3 are schematic sectional views of a fluid pressure governor valve assembly according to the present invention in different conditions;

FIGS. 4 to 6 are similar to FIGS. 1 to 3, respectively but show a modified form of the governor assembly of the invention.

Figure 3:
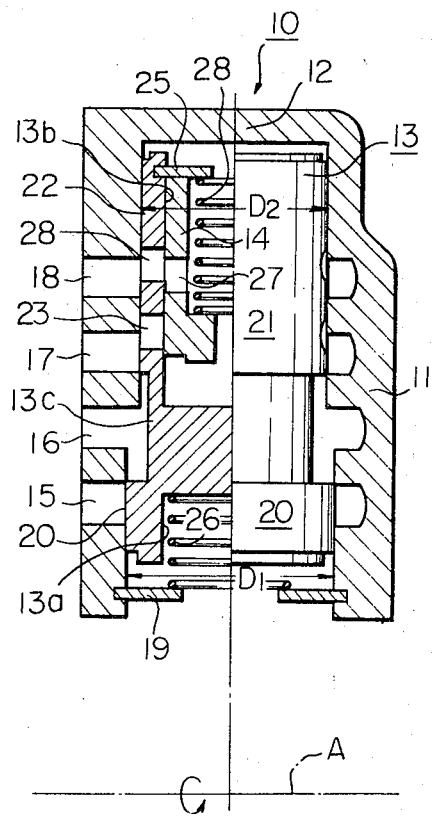

Referring first to FIG. 1, the fluid pressure governor valve assembly according to the present invention is designated generally by reference numeral 10 and comprises a hollow, generally cylindrical governor housing or body 11 which is fixedly mounted on an output shaft (not shown) of the power train of a transmission, and is rotatable therewith about an axis A of the output shaft. The governor body 11 has its outer end closed by an outer end wall 12 integrally formed therewith. Inside the body 11 are axially slidably disposed a primary valve element 13 having inner and outer cavities 13a and 13b, respectively, that are isolated from each other by an intermediate wall 13c, and a secondary valve element 14 which is accommodated in the outer cavity 13b of the primary valve element 13. There are formed in the sidewall of the body 11 a series of spaced ports including, as enumerated in the sequence in which they are distanced from the axis A of the output shaft, a first exhaust port 15, a fluid outlet port 16 to deliver a regulated governor pressure, a fluid pressure supply port 17 communicating with a source of pressurized fluid, and a second exhaust port 18. A snapring 19 is securely anchored in the governor body 11 adjacent the inner end thereof for limiting inward sliding movement of the primary valve element 13. The governor body 11 is internally formed so that the inside diameter $D_1$ of its portion inboard from the fluid outlet port 16 is greater than the diameter $D_2$ of the remaining portion which is outboard from the port 16.

The primary valve element 13 is axially slidable between the snapring 19 and the outer end wall 12 of the governor body 11 and has two spaced lands 20 and 21 of different diameters which are substantially equal to the inside diameters $D_1$ and $D_2$, respectively, of the governor body 11. The space between the lands 20 and 21 forms a passage 22. The land 20 is adapted for closing and opening the first exhaust port 15. The land 21 has formed therein vents 23 and 24 which are communicative with the ports 17 and 18, respectively, of the governor body 11, as the valve element 13 axially slides. Adjacent the outer end of the primary valve element 13 is provided a snapring 25 for restricting outward sliding movement of the secondary valve element 14. Inward sliding movement of the secondary valve element 14 is restricted by the intermediate wall 13c formed integrally with the primary valve element 13. Interposed between the snapring 19 and the intermediate wall 13c is a compression spring 26 which serves to normally bias the primary valve element 13 toward the outer end wall 12 of the governor body 11.

The secondary valve element 13 has formed therein a vent 27 which is positioned to be selectively brought into and out of communication with the vents 23 and 24 of the primary valve element 13 as the secondary valve element 14 slides along the inner wall of the valve element 13 between the snapring 25 and the partition member 13c. A compression spring 28 is seated on the snapring 25 in the secondary valve element 14, which consequently is normally biased toward the partition member 13c.

When, now the transmission remains at rest, no fluid pressure is imparted to the governor valve thus constructed, and, therefore, the primary valve element 13 is forced against the outer end wall 12 of the governor body 11 by the action of the spring member 26. The secondary valve member 14 similarly is forced against the outer face of the intermediate wall 13c of the primary valve element 13 the action of the spring 28 as shown in FIG. 1.

When the output shaft is rotated at low speeds, the line pressure delivered from the source of pressurized fluid is introduced into the chamber 13a through the vent 27 in the secondary valve element 14 communicating with the fluid inlet port 17. The pressure thus introduced causes the primary valve element 13 to move inwardly or toward the snapring 19 at the inner end of the governor body 13 against the combined effort of the action of the spring 26 and a centrifugal force acting thereon in opposite direction until the primary valve element 13 arrives at the position shown in FIG. 2 so as to engage with the snapring 19.

At this stage, the centrifugal force acting on the secondary valve element 14 is relatively small and, therefore, the valve element remains pressed against the intermediate wall 13c by the action of the spring 28 as shown in FIG. 2. It will be seen from this figure that no governor pressure is produced yet with communication still maintained between the outlet port 16 and exhaust port 15 by way of the passage 22.

As the speed of the output shaft increase, the secondary valve element 14 is caused to move away from the axis A of the output shaft under the influence of increased centrifugal force and abuts against the snapring 25. By this movement of the secondary valve element 14, the vent 27 which has been in communication with the inlet port 17 is shifted into a position to communicate with the exhaust port 18, thereby releasing therethrough the fluid pressure present in the cavity 13b. This causes the primary valve element 13 to move outward by the combined spring and centrifugal forces acting thereon, providing communication between the ports 18 and 17 as shown in FIG. 3. The fluid within the cavity 13b is thus discharged from the port 18 through the vents 24 and 27 of the primary and secondary valve elements 13 and 14, respectively. At the same time, the control pressure at the port 17 begins to flow into the outlet port 16 through the passage or clearance dictated by the land 21 of the primary valve element 13. The control pressure introduced into the passage 22 is partly discharged through the clearance of the port 15 which is dictated by the land 20 of the primary valve element 13. The fluid pressure within the governor valve is biased inwardly due to the difference in diameter between the lands 20 and 21 and is balanced with the combined effort of the spring 26 and centrifugal force when the two valve elements 13 and 14 assume the positions shown in FIG. 3. Therefore, if the rotational speed of the output shaft is further increased, the primary valve element 13 moves outward under the influence of an increased centrifugal force and the fluid passage in the inlet port 17 which is dictated by the land 21 widens to produce an increased governor pressure at the outlet port 16.

Figure 7:
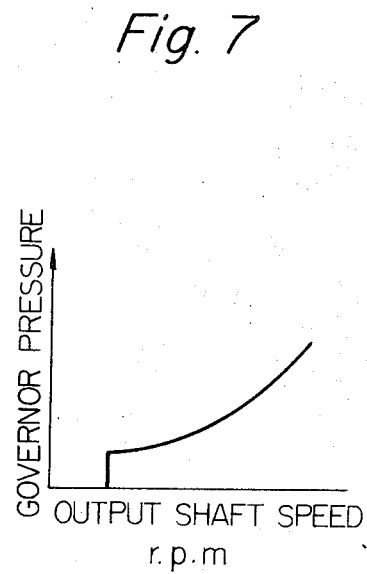
FIG. 7 is a graphical representation of the governor pressure characteristics for each of the embodiments shown in FIGS. 1 to 6.

An example of the relationship between the output shaft speed and the governor pressure is illustrated in FIG. 7 wherein the ordinate represents the governor pressure and the abscissa represents the rotational speed of the output shaft. As shown in FIG. 2, with the output shaft rotating at low speeds (for example, in the range from zero to 500 r.p.m.), the primary valve member 13 is held pressed against the snapring 19 under the influence of the fluid pressure introduced into the cavity 13c through the vent 27 which is in fluid communication with the fluid inlet port 17 so that the governor pressure at the outlet port 16 is held at zero. When the speed of the output shaft reaches a predetermined value (for example, 500 r.p.m.), the secondary valve element 14 is caused to slide outwardly to engage with the snapring 25 by the combined effort of the centrifugal force and the spring 28, as shown in FIG. 3. Thus, the line pressure at the inlet port 17 is regulated by the primary valve element 13 so as to regulate the governor pressure at the outlet port 16 in response to the changes in the rotational speed of the output shaft.

Figure 6:
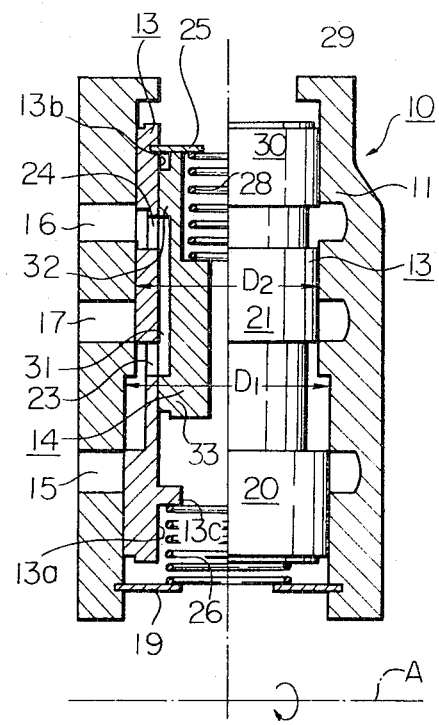

FIGS. 4 to 6 show a modified form of the governor valve assembly according to the invention, which comprises a governor body 11 and primary and secondary valve elements 13 and 14, respectively, similarly to those in the embodiment shown in FIGS. 1 to 3. In this modified assembly, however, the governor housing or body 11 is provided with only one exhaust port 15 and is formed at the outer end thereof with an annular flange 29 for restricting outward sliding movement of the primary valve element 13. A land 30 is formed at the outermost end of the primary valve element 13 in slidable engagement with the inner wall of the body 11.

When, now, the transmission output shaft is not rotating, the line pressure from the source of pressurized fluid is not passed to the inlet port 17 so that the valve elements 13 and 14 are held in the positions shown in FIG. 5 by the action of the springs 26 and 28. When the output shaft is rotated at low speeds and line pressure from the source of pressurized fluid is drawn to the port 15, the primary valve element 13 is urged, due to the difference in diameter between the lands 20 and 21, inwardly toward the axis A of rotation against the centrifugal force acting thereon. At the same time, the secondary valve element 14 and accordingly the primary valve element 13 move into the positions shown in FIG. 6 and are held in these positions until the rotational speed of the output shaft reaches a predetermined value (for example, approximately 500 r.p.m.). At low speeds, the fluid inlet port 17 is substantially closed by the land 21 of the primary valve element 13 and the exhaust port 25 opened appreciably by the land 20 so that no governor pressure obtains at the outlet port 16.

When the rotational speed of the output shaft is further increased, the secondary valve element 14 is caused to move, against the action of the spring 28, outwardly away from the axis A of the output shaft under the influence of the centrifugal force acting thereon, establishing communication between the vents 23 and 24 of the primary valve element 13 through a passage 31 formed between the lands 32 and 33 of the secondary valve element 14. Thus, a regulated pressure is delivered through the passage 31 and outlet port 16, as seen in FIG. 6.

The structure shown in FIGS. 4 to 6 is also capable of providing the governor pressure characteristics shown in the plot of FIG. 7. No governor pressure does obtain before the speed of the output shaft reaches a predetermined value (for example, approximately 500 r.p.m.) and before communication is established between the ports 16 and 17 by the outward displacement of the secondary valve element 14 caused by an increased centrifugal force, the output pressure being regulated by the land 21 of the primary valve element 13. With the output shaft rotating at a further increased speed, the primary valve element 13 is urged outward under the influence of a centrifugal force acting thereon against the fluid pressure which is biased inward due to the difference in diameter between the lands 20 and 21 so that the land 21 opens the port 16 wider to produce an increased governor pressure at the outlet port 16.

It will be clear from the foregoing that, according to the present invention, the various governor elements can be assembled into a single-piece unit and, only one conduit for the oil distributor is required. It will be also appreciated that the governor assemblies of the invention are simple in construction, easy and economical to manufacture, and capable of producing governor pressure characteristics that are comparable with those obtained by conventional compound governor systems. It may be added that the construction according to the invention is completely fluidtight.

What is claimed is:

1. A fluid pressure governor valve assembly of the type described, comprising a hollow cylindrical housing having spaced greater and smaller inside diameter portions and formed in its peripheral wall with at least a fluid inlet port communicating with a source of pressurized fluid, a fluid outlet port and an exhaust port, a primary valve element axially slidably received in said housing and having in its peripheral wall at least a vent and two spaced lands adapted for regulating fluid communication between said ports of the housing, said lands slidably fitting said greater and smaller inside diameter portions, a secondary valve element slidably received in said primary valve element, a snapring securely anchored in the inner end portion of said housing for restricting inward sliding movement of the primary valve element, means provided at the outer end of the housing for restricting outward movement of the primary valve element, a second snapring securely anchored in the outer end portion of the primary valve element for restricting outward sliding movement of the secondary valve element, a first spring acting on said primary valve element and seated on said first snapring, a second spring acting on said secondary valve element and seated on said second snapring, the fluid communication between the ports of the housing being regulated to produce a modulated governor pressure at said outlet port by the primary and secondary valve elements moving under the influence of the fluid pressure supplied through said inlet port, centrifugal force acting thereon and actions of said first and second springs.

2. A fluid pressure governor valve assembly comprising a hollow cylindrical housing having spaced greater and smaller inside diameter portions and formed in its peripheral wall with a fluid port communicating with a source of pressurized fluid, a fluid outlet port and two exhaust ports, a primary valve element slidably received in said housing and having in its peripheral wall two spaced lands adapted for regulating fluid communication between said ports of the housing, a secondary valve element slidably received in said primary valve element, a first snapring securely anchored in the inner end portion of said housing for restricting inward sliding movement of the primary valve element, wall means provided at the outer end of the housing for restricting outward movement of the primary valve element, a second snapring securely anchored in the outer end portion of the primary valve element for restricting outward sliding movement of the secondary valve element, a first spring acting on said primary valve element and seated on said first snapring, a second spring acting on said secondary valve element and seated on said second snapring, the fluid communication between the ports of the housing being regulated to produce a modulated governor pressure at said outlet port by the primary and secondary valve elements moving under the influence of the fluid pressure supplied through said inlet port, centrifugal force acting thereon and actions of said first and second springs.

3. A fluid pressure governor valve assembly comprising a hollow cylindrical housing having spaced greater and smaller inside diameter portions and formed in the sidewall thereof with a fluid outlet port, a fluid inlet port and an exhaust port, a primary valve element slidably received in said housing and having in its peripheral wall three spaced lands for regulating fluid communication between said ports of the housing, a secondary valve element slidably received in said primary valve element, a first snapring securely anchored in the inner end portion of said housing for restricting inward sliding movement of the primary valve element, an annular flange provided at the outer end of the housing for restricting outward movement of the primary valve element, a second snapring securely anchored in the outer end portion of the primary valve element for restricting outward sliding movement of the secondary valve element, a first spring acting on said primary valve element and seated on said first snapring, a second spring acting on said secondary valve element and seated on said second snapring, the fluid communication between the ports of the housing being regulated to produce a modulated governor pressure at said outlet port by the primary and secondary valve elements moving under the influence of the fluid pressure supplied through said inlet port, centrifugal force acting thereon and actions of said first and second springs.

* * * * *